United States Patent
Hoff

(10) Patent No.: US 7,379,063 B2
(45) Date of Patent: May 27, 2008

(54) MAPPING APPLICATION FOR RENDERING PIXEL IMAGERY

(75) Inventor: Christopher G. Hoff, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 274 days.

(21) Appl. No.: 10/901,603

(22) Filed: Jul. 29, 2004

(65) Prior Publication Data

US 2006/0022978 A1 Feb. 2, 2006

(51) Int. Cl.
*G06T 15/10* (2006.01)
*G09G 5/00* (2006.01)

(52) U.S. Cl. ............... 345/427; 345/648; 345/649; 345/672

(58) Field of Classification Search ......... 345/427, 345/648, 649, 672
See application file for complete search history.

(56) References Cited

U.S. PATENT DOCUMENTS

| | | | | |
|---|---|---|---|---|
| 4,661,811 A * | 4/1987 | Gray et al. | ............... | 345/636 |
| 4,847,788 A * | 7/1989 | Shimada | ............... | 345/634 |
| 5,161,886 A * | 11/1992 | De Jong et al. | ............... | 701/209 |
| 5,687,307 A * | 11/1997 | Akisada et al. | ............... | 345/428 |
| 5,884,217 A * | 3/1999 | Koyanagi | ............... | 701/208 |
| 6,011,566 A * | 1/2000 | Salamon | ............... | 345/600 |
| 6,141,014 A * | 10/2000 | Endo et al. | ............... | 345/427 |
| 6,205,181 B1 * | 3/2001 | Hu et al. | ............... | 375/240.26 |
| 6,341,254 B1 * | 1/2002 | Okude et al. | ............... | 701/208 |
| 6,421,134 B1 * | 7/2002 | Kuroshima et al. | ............... | 358/1.16 |
| 6,556,185 B2 * | 4/2003 | Rekimoto | ............... | 345/157 |
| 6,611,753 B1 * | 8/2003 | Millington | ............... | 701/209 |
| 6,721,952 B1 * | 4/2004 | Guedalia et al. | ............... | 725/38 |
| 6,836,270 B2 * | 12/2004 | Du | ............... | 345/419 |
| 2001/0034588 A1 * | 10/2001 | Agrawals et al. | ............... | 703/2 |
| 2001/0038718 A1 | 11/2001 | Kumar et al. | | |
| 2002/0145610 A1 * | 10/2002 | Barilovits et al. | ............... | 345/538 |
| 2004/0056861 A1 * | 3/2004 | Huber et al. | ............... | 345/428 |
| 2004/0100471 A1 * | 5/2004 | Leather et al. | ............... | 345/506 |
| 2004/0165775 A1 * | 8/2004 | Simon et al. | ............... | 382/181 |
| 2005/0031197 A1 * | 2/2005 | Knopp | ............... | 382/154 |

(Continued)

FOREIGN PATENT DOCUMENTS

| EP | 0 510 939 A | 10/1992 |
|---|---|---|
| EP | 0 738 874 A | 10/1996 |
| EP | 0 841 537 A | 5/1998 |

OTHER PUBLICATIONS

Shirley et al., "Fundamentals of Computer Graphics: second edition", A K Peters, LTD, 2005, pp. 201-211.*
Wikipedia, "Ray tracing", http://en.wikipedia.org/wiki/Ray_tracing, Mar. 6, 2004.*

*Primary Examiner*—Ulka Chauhan
*Assistant Examiner*—Jeffrey J. Chow
(74) *Attorney, Agent, or Firm*—Leonard A. Alkov

(57) ABSTRACT

A mapping application relies on a modified affine transformation algorithm to provide near real-time navigation of imagery, track-up capability and integration of segment and picture data. The affine transformation is modified to map a "world space" comprised of a plurality of pixel maps onto a view port. The pixel data for the maps is preferably stored in vertical strips of memory to reduce the likelihood of cache misses. The mapping application is most useful for rendering pixel imagery on a platform with limited processing power, limited memory and small display sizes, e.g., "hand held devices" such as a GPS handset, or Pocket PC.

32 Claims, 12 Drawing Sheets

U.S. PATENT DOCUMENTS

2005/0033511 A1* 2/2005 Pechatnikov et al. ....... 701/210
2005/0184993 A1* 8/2005 Ludwin et al. ............. 345/502
2005/0270311 A1* 12/2005 Rasmussen et al. ........ 345/677
2007/0014488 A1* 1/2007 Chen et al. ................. 382/294

* cited by examiner

Fig. 2
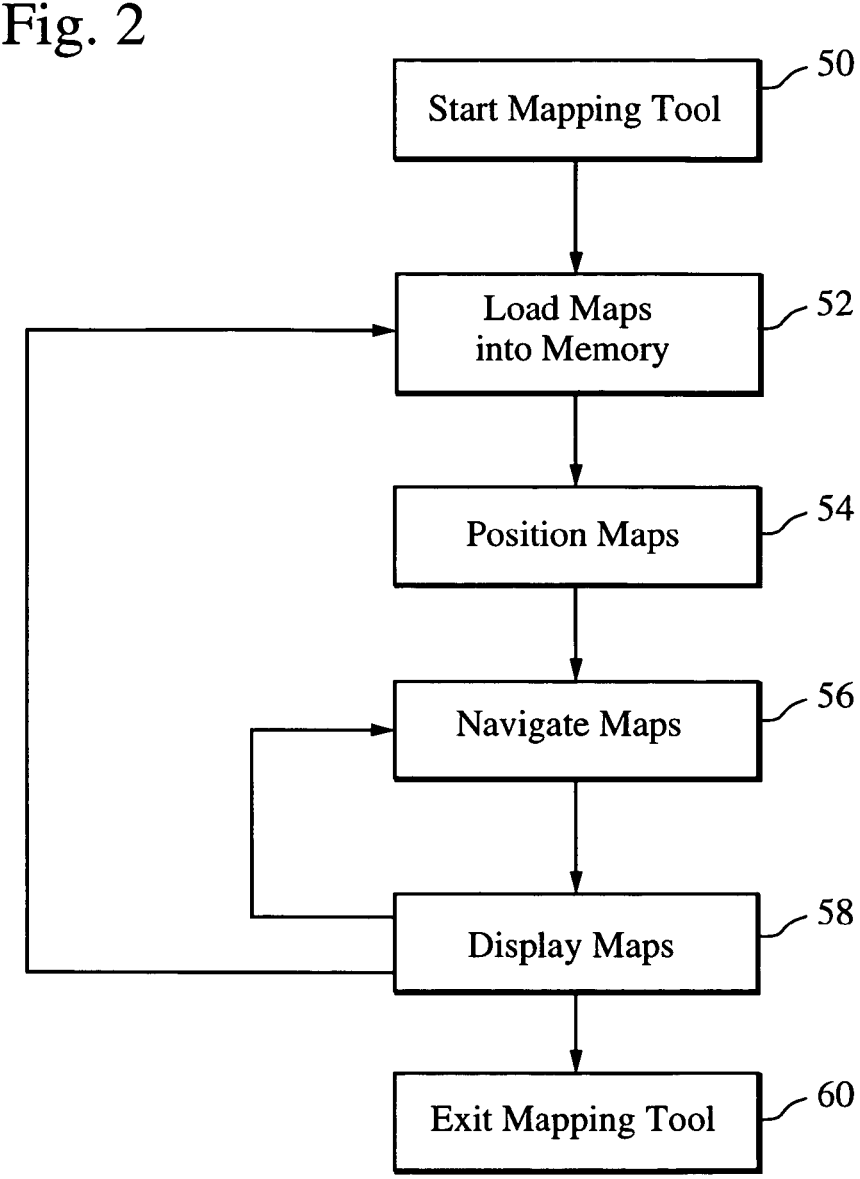
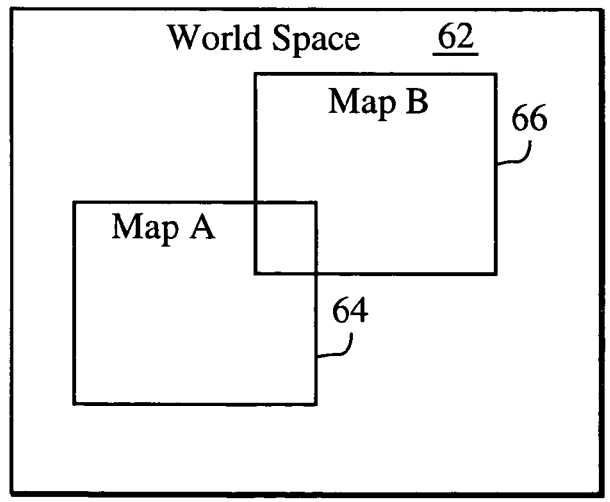
Fig. 4a

MAPPING APPLICATION FOR RENDERING PIXEL IMAGERY

BACKGROUND OF THE INVENTION

1. Field of the Invention

This invention relates to mapping applications, and more specifically to a mapping application for rendering pixel imagery on platforms with limited processing power and memory and small display sizes.

2. Description of the Related Art

Hand held devices are rapidly evolving beyond their use as an address book, calendar, note pad, etc. They are merging with other technologies to provide cellular telephone service, email, wireless internet and other applications. Continuing improvements in processor speed, memory, displays and battery power are making the hand held devices a powerful and ubiquitous tool for consumers, business, and the military.

Mapping applications allow users to display and navigate maps on a hand held display using GPS technology. Mapping application software should support the ability to pan around a map, zoom in and out, manipulate navigation objects, and view a tracked position relative to displayed maps in near real-time, e.g. at least 10 frames per second. Military handsets usually have additional direction-finding hardware such as digital compass and accelerometers, which make the application feature of "track-up" (the ability to rotate the map relative to user orientation) desirable for that market. These requirements have to be implemented on a battery-powered handheld device with limited processing power, memory and display size. Therefore, the application software must be very efficient.

Most consumer GPS mapping applications utilize line segment data to represent roads, land-masses, and other boundaries. Consumer applications such as those seen on Garmin, Magellan, or standalone Pocket PC suites are capable of displaying line segment data. However, their frame-rate is limited by the need to redraw all of the line segments on-screen every time the view of the map is changed. These applications alleviate the problem somewhat by preprocessing the line segment data into spatial data structures to skip the clipping step. They also employ several drawing tricks such as only drawing certain line segment data at particular zoom levels, e.g., only draw freeways at distant zoom levels, and only drawing all of the line segment data when the user "stays still", i.e. doesn't pan or zoom the screen rapidly. Such optimizations allow these applications to achieve a moderate performance level of a few frames per second at best. However, some of the drawing tricks employed can have the effect of temporarily disorienting the user when they are rapidly panning or zooming. Most of these applications do not support rotation.

Military applications and certain consumer applications use detailed imagery, like topographic maps or pictures taken from satellites or surveillance aircraft. These maps typically take the form of large picture imagery, composed of pixel data rather than line segment data. The application software that supports these types of maps must process a lot more data to perform the same display and navigation tasks. Applications such as ESRI's ArcPad and MapServer CE support displaying these types of maps. However, on a platform such as a PDA having limited memory and processing power, the supported frame rate is very slow, a slide show at best. These applications use rendering algorithms that are more efficient at panning than zooming, so they typically limit zoom capability to a "step" zoom between a few constant defined zoom levels so that the slow update rate is less noticeable. This can have the effect of temporarily disorienting the user when "jumping" from one zoom level to the other. In addition, rotating picture maps is a feature that is completely unsupported by any existing PDA mapping tools.

A new approach to the PDA mapping application problem for pixel imagery is needed, especially in the military mapping space. The performance of panning and zooming, particularly important because of the small PDA display size, needs to be increased by at least an order of magnitude to provide near real-time response. Ideally, this would be done without the limitations that the known approaches impose upon the user. A real-time "smooth-zoom" feature is desirable in situations where the user cannot afford to temporarily lose track of their location, such as when driving or operating within a military environment. The desire for a "track-up" feature creates an unmet need to rotate maps, preferably with the same performance as zooming and panning. Finally, there is a need to create an application that supports both line segment data and picture data, and still maintains good performance with both—particularly for the military whose theatres include both natural and urban environments.

SUMMARY OF THE INVENTION

The present invention provides a mapping application for rendering pixel imagery on platform with limited processing power, memory and display size. The mapping tool provides the capability to navigate multiple images simultaneous, the ability to pan, scan, zoom and rotate in near real-time, and enables "track-up" mode.

The mapping application first defines a world space, a coordinate system representing a "world", typically 2D, in which the user can navigate. Bounding objects, typically rectangles, are defined in world space with each representing the extent and position of a particular map in world space. Although these objects contain no image data of their own (they consist simply of bounding world space coordinates, specifically the four vertices in the case of a bounding rectangle), each object is associated with a particular map and its corresponding pixel data stored elsewhere in memory. In response to user input, these objects can be added, removed, associated with different maps, and resized. Also, map image data can be loaded, added or removed by the user, which in turn can be used for association with world space objects.

A view port is defined within world space by bounding world space coordinates that represents what part of the "world" the user sees on the display. A typical rectangular view port is represented by its four rectangular vertices. The view port is translated, scaled, and rotated within world space in response to user input. The mapping application then performs an affine transformation to assign world space coordinates to each pixel of the display represented by the view port. For every assigned world space coordinate that intersects with a world space map object, the mapping application converts the world space coordinate into a map space coordinate using a second affine transformation and copies the map's pixel value to the display pixel. The mapping application assigns a background value to all other non-intersecting pixels. Once all display pixels are assigned, an entire "frame" is suitably constructed, and the frame is copied to the actual hardware display buffer so that it is visible on screen.

In another embodiment, the execution time to perform the affine transformation is, on average over all rotations of the view port in world space, greatly improved by storing the map pixel data in vertical strips of memory. On average, this will greatly reduce the likelihood of a cache miss when rendering the maps. In this case pixel data is sampled by determining the vertical strip in memory in which the pixel data resides, converting the map space coordinate into a vertical strip column coordinate, and sampling the pixel data from the vertical strip at the column coordinate.

In another embodiment, a hand held device includes non-volatile storage for storing a plurality of pixel maps and a mapping application. Once initiated, the mapping application is loaded into main memory. User I/O is used to load maps from non-volatile storage into main memory in a world space coordinate system and to navigate world space to position a view port therein. The pixel data is stored in vertical strips in memory. A processor executes the mapping application to assign coordinates in world space to each pixel in the view port using an affine transformation, convert the world space coordinates that intersect a map into map space coordinates using a second affine transformation, sample each pixel at its coordinates from the map's vertical strips stored in memory, assign the sampled pixel value to that pixel in the view port, assign a background value to the non-intersecting pixels and paint the display with the map and background pixels assigned to the view port.

If navigation hardware such as a GPS receiver is present and geo-referencing data is provided with the map image data, the user can navigate based on his/her location relative to the loaded maps. If direction-finding hardware is present, such as a digital compass or accelerometer, then the user's orientation can be displayed relative to the map's orientation. With direction-finding hardware, the mapping application will automatically rotate the map according to the user's orientation, so that the direction the user is facing is always upward on the view port.

To further improve processing efficiency, the processor preferably executes the mapping application using integer fixed-point math whenever possible, writes and reads pixel data in double words, and constructs an entire graphics frame in an off-screen double-buffer and then paints the entire frame to the view port at once.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2 is a flowchart of the display and navigation process from a user perspective;

FIGS. 4*a* through 4*i* are illustrations of the steps of the affine transformation;

DETAILED DESCRIPTION OF THE INVENTION

The present invention relies on a modified affine transformation algorithm to provide near real-time navigation of imagery, track-up capability and integration of segment and picture data. The mapping application is most useful for rendering pixel imagery on a platform with limited processing power, limited memory and small display sizes, e.g., "hand held devices" such as a GPS handset, a personal digital assistant (PDA) or cell phone. However, the techniques could be applied to other platforms such as car navigation systems, laptop computers or PCs.

Affine transformations are algorithms most often used in 3D graphics for texturing polygons (triangles are most commonly used) with bitmaps. They are also used in applications that allow the rotation of 2D images, such as Power Point®. Although the affine transformation algorithm is known, its use in and modification for a map rendering application is new. The standard affine algorithm, although adequate for displaying a single image of limited size as is done in 3D graphics or Power Point®, does not meet all of the requirements for mapping applications. Mapping applications are expected to have the ability to display multiple maps at the same time, handle very large maps and rotate the maps. Affine algorithms only paint a "map space" (referred to as "texture space" in 3d graphics) portion of a single bitmap onto a polygon, which prevents it from supporting multiple maps. Furthermore, the standard memory bitmaps are not optimized for rotation in very large maps.

Figure 1:
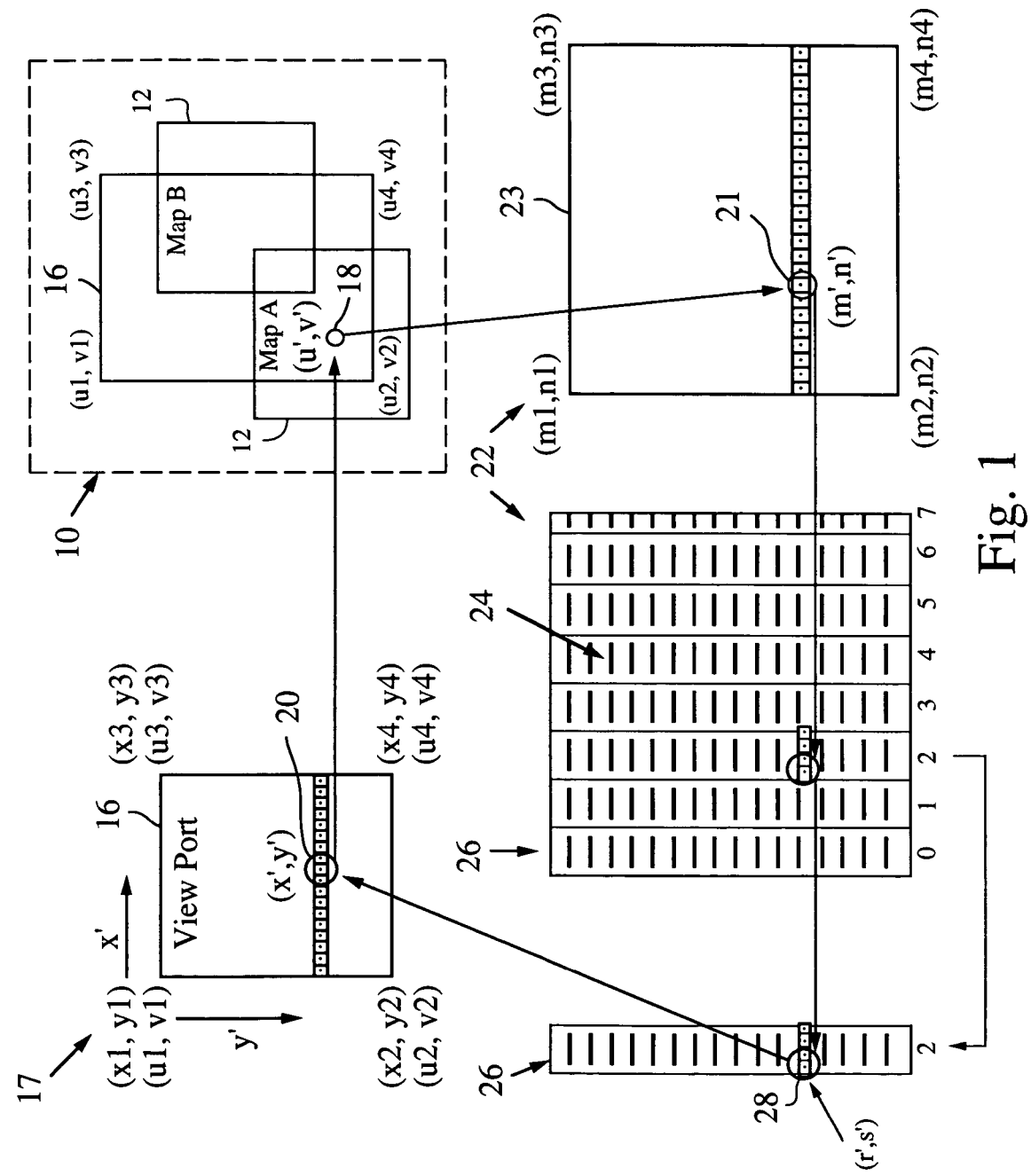
FIG. 1 is a diagram providing an overview of the mapping application in accordance with the present invention.

An overview of the mapping application in accordance with the present invention is illustrated in FIG. 1. World space 10 is a (u,v) coordinate system that can be populated with multiple rectangular regions 12 (more generally convex polygons) that signify the position and spatial extent of the pixel maps A and B. In fact, only the vertices of rectangles need to be stored in world space. A view port 16 is defined in an (x,y) coordinate system in display space 17 and represents what is seen on the display. The user selects and positions maps in world space or they are automatically positioned relative to one another according to geo-reference data. The user then positions the view port in world space by navigating via pan, zoom, and rotate, or the view port is automatically located using positional and orientation information. The view port's orientation in world space is changed by applying the requisite translation, scaling and rotation transforms to its four world space vertices.

The application maps world space coordinates (u',v') 18 to each pixel (x',y') 20 of the view port 16 using an affine transformation. For each pixel in the view port 16 that intersects a rectangle 12, the application converts the world space coordinate (u',v') 18 using a second affine transformation into a map space coordinate (m,n) 21 in map space 22 for the map 23 (Map A) associated with that particular rectangle 12. Image data 24 for Map A 12 is stored in vertical strips 26 in memory. Using the map space coordinate (m, n) 22, the application determines the vertical strip 26 of map image data in which the pixel lies and converts the map space coordinate (m,n) 22 into a vertical strip column coordinate (r, s) 28. Any overlapping maps are arbitrated based, for example, on priority or blending. The application samples the map's pixel data 24 and assigns a value to that pixel (x',y') 20 in the view port 16. This process is repeated for each pixel in the view port. Any non-intersecting pixels within the view port are assigned a background color value. The background value is typically one color such as black or white but is not so constrained. Once completed, all of the view port pixels (x',y') 20 are assigned a color value with which to "paint" the display. Any segment data is stored as a monochrome bitmap and rendered like any of the other maps.

The mapping application incorporating the modified affine transformation is extremely fast and delivers very good visual results for surfaces that are parallel to the display's viewing plane, perfect for 2D maps. The concept of painting a "world space" onto the display allows the mapping application to display multiple maps at the same time. The modified affine transformation provides the ability to pan, zoom and rotate an image in near real-time with any granularity and at any rotation angle the user chooses. Improvements in frame rates of 15× to 30× have been demonstrated with software that supports track-up and does not impose limitations on, for example, zoom level.

Mapping applications must deal with very large, variable image sizes (2000 or more pixels per dimension is common). Standard affine algorithms typically define a constant image size (512×512 pixels is standard) to optimize for CPU cache size. If a standard affine algorithm were used to rotate a large image on a typical PDA cache-limited CPU to a vertical orientation (90 or 270 degrees), it would encounter memory inefficiencies so severe that it would incur an approximate 10× performance hit. Because the mapping application does not have the luxury of choosing a small, constant pixel resolution for its images, its affine algorithm has been adapted to better cope with these memory inefficiencies. By presenting the image data to the affine algorithm in vertical strips of memory rather than in a standard bitmap memory orientation, the map software reduces the above situation's 10× performance penalty to 3×.

Because the map software is intended to operate on a PDA, other important, but more mundane optimizations to its affine algorithm include using integer fixed point over floating point math whenever possible, double word read/writes whenever possible, and double buffering.

The details of an embodiment of the mapping application for use in a hand held device including the I/O interface with the user and a step-by-step presentation of the modified affine transformation are illustrated in FIGS. 2 through 6. The equations for implementing the modified affine transformation assume a world space populated with a number of rectangular maps to be rendered on a rectangular display. The equations can be generalized to accommodate non-standard shapes as long as the display is a convex polygon. However, industry convention is to render rectangular maps onto rectangular displays, which allows for further optimization of the affine transform.

As shown in FIG. 2, from a user's perspective the mapping application is very similar to existing applications except that the application allows the user to rotate maps on the display and provides for track-up mode in which the maps are automatically rotated to track user orientation in near real-time. More specifically, a user-navigates an on-screen menu to start the mapping tool (step 50) and load map(s) from non-volatile storage into memory (step 52). Maps are positioned relative to one another according to their geo-location or user preference to define the current world space (step 54). Maps can also be removed from memory. Using I/O buttons and a touch screen, the user navigates the maps in world space (step 56) by creating and editing NAV objects, changing the orientation of the map view, and arbitrating map layering, blending, and visibility.

If track-up mode is active, rotation is automatically controlled by direction-finding hardware. The mapping application performs the modified affine transformation as detailed below to paint the display with the portion of the map(s) in the view port at the selected translation, zoom, and rotation (step 58). The process iterates as the user continues to navigate through the existing maps or changes maps loaded into memory. When finished, the user uses the on-screen menu to exit the mapping tool (step 60).

Figure 3:
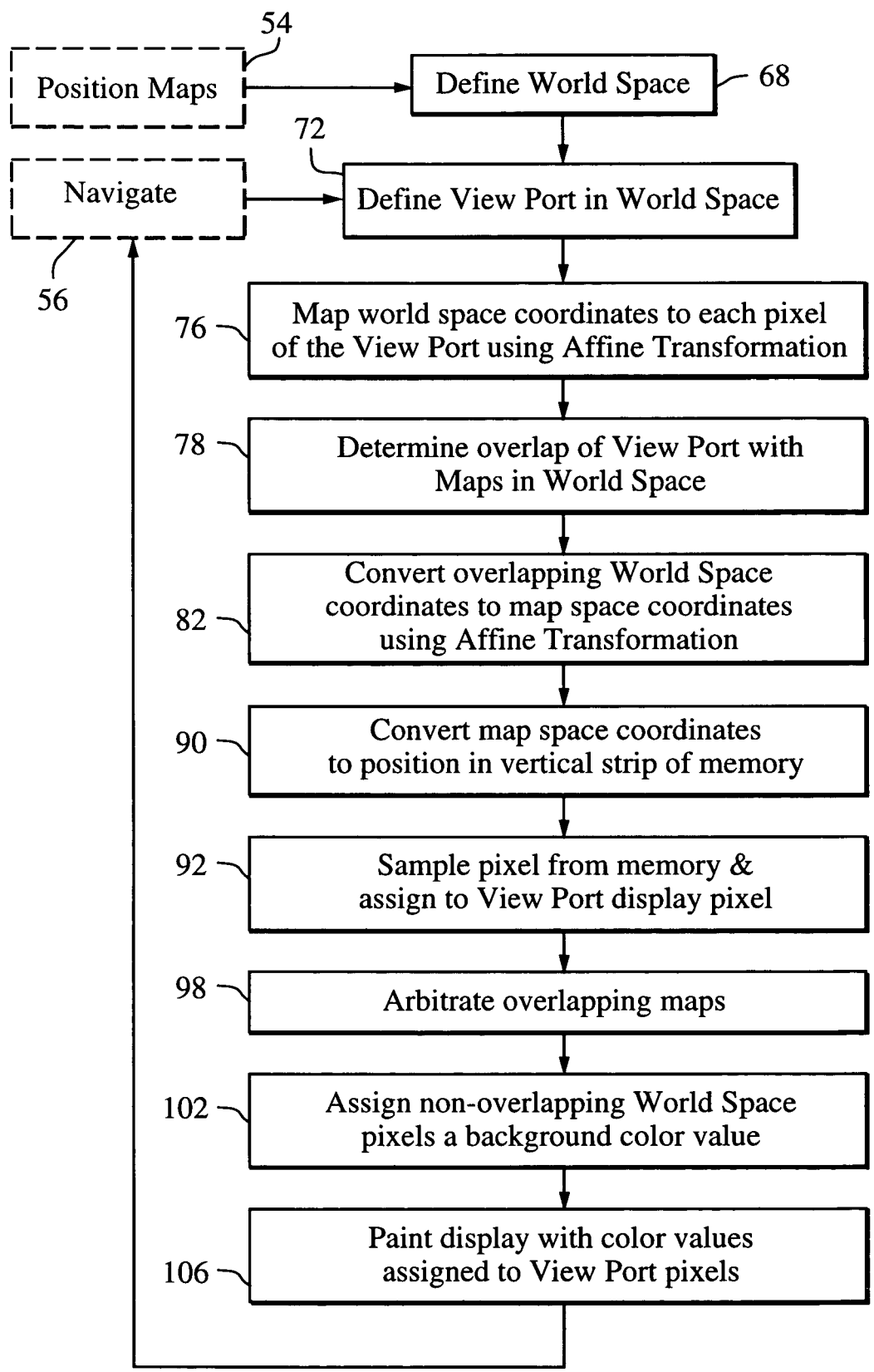
FIG. 3 is a flowchart of the affine mapping transform for painting the display with the portion of world space defined by the view port.

As shown in FIGS. 3 through 5, the modified affine transformation works in response to the selection and positioning of maps (step 54) and the navigation of those maps by the user (step 54). The application defines world space 62 as shown in FIG. 4a as a 2D coordinate system (u,v) occupied by rectangular regions 64 and 66 representing maps A and B (step 68). For the purposes of this description, world space will be considered horizontally increasing to the right and vertically increasing downward. View port 70 is defined in coordinate system (x,y) in display space as shown in FIG. 4b and represents what is seen on the display in world space 62 (step 72). The rectangular view port 70 has display coordinates (x1, y1), (x2, y2), (x3, y3) and (x4, y4). For each of these display coordinates, a corresponding world space coordinate (u1, v1), (u2, v2), (u3, v3) and (u4, v4) respectively, will be assigned.

Figure 4B:
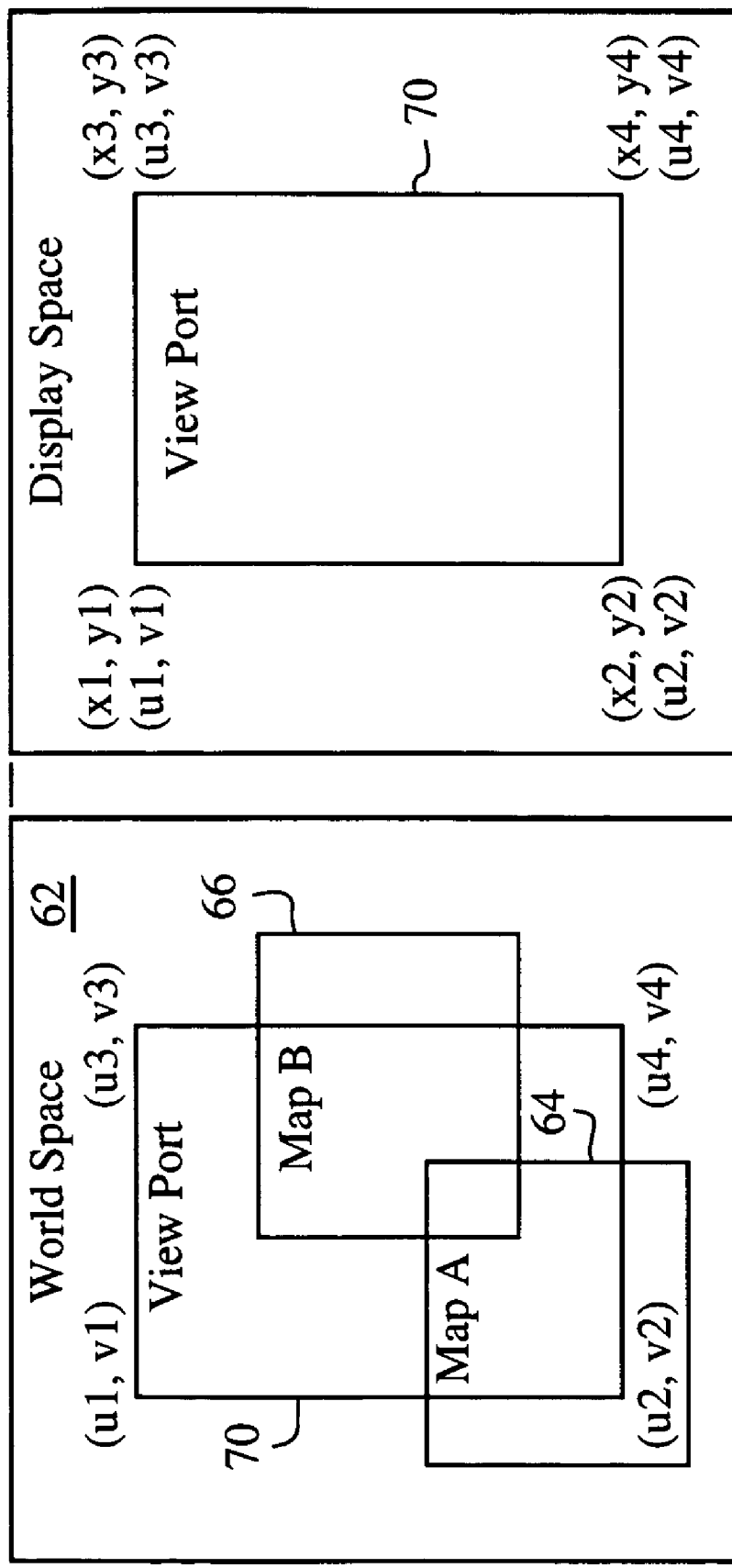
Figure 4C:
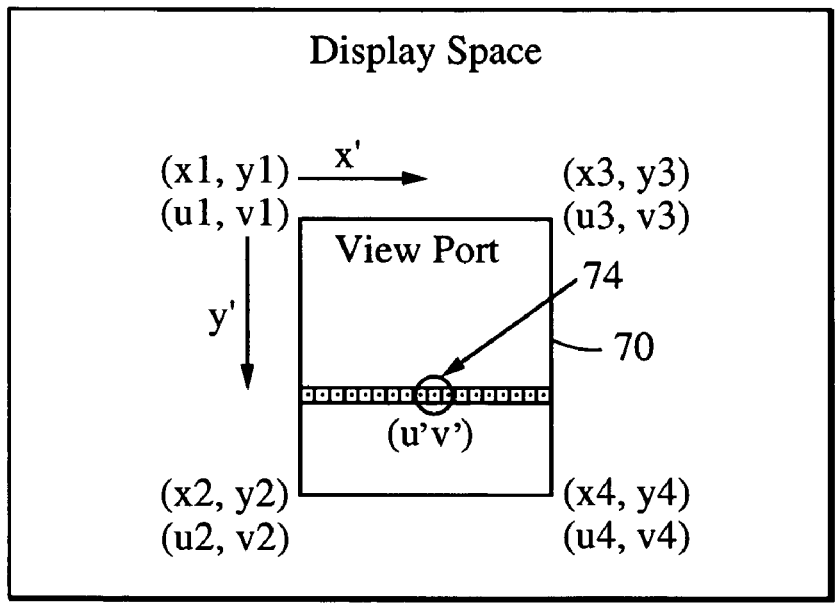

The application maps world space coordinates to each pixel (x', y') 74 in the view port 70 (step 76) as shown in FIG. 4c. More specifically, for each (x', y') display coordinate within the bounds of the view port 70, the application assigns a (u', v') world space coordinate using an affine transformation. To do this, the application computes these four slope values:

$$dudx=(u3-u1)/(x3-x1)$$

$$dvdx=(v3-v1)/(x3-x1)$$

$$dudy=(u2-u1)/(y2-y1)$$

$$dvdy=(v2-v1)/(y2-y1)$$

The application solves for u' and v' using the formula:

$$u'=u1+(y'-y1)*dudy+(x'-x1)*dudx$$

$$v'=v1+(y'-y1)*dvdy+(x'-x1)*dvdx$$

Using these sets of equations, the application can represent view port 70 in the (u,v) coordinate system in world space 62 for any translation, scale (zoom level) or rotation or combination thereof.

The mapping application is optimized for an affine transformation of a single rectangular polygon that represents the entire view port. The affine algorithm simplifies to performing two linear interpolations, one along the vertical axis of the view port and the second along the horizontal axis of the view port for each pixel of the display. The rectangle is horizontal in display space, so the algorithm only needs to linearly interpolate between the left and right edge of the rectangle. In addition, the left and right edge of the rectangle will always have the same slope in world space, which means that both the vertical and horizontal affine slopes of interpolation do not change. This allows the algorithm to pre-calculate constant slope values that apply to both edges. The algorithm then proceeds as normal for an affine transformation; filling the bottom horizontal scan line of the rectangle and up until it fills the entire view port.

The application then determines if mapped world space coordinates (u',v') 74 within view port 70 intersect with any of the rectangular map regions 64, 66 in world space 62 (step

Figure 4D:
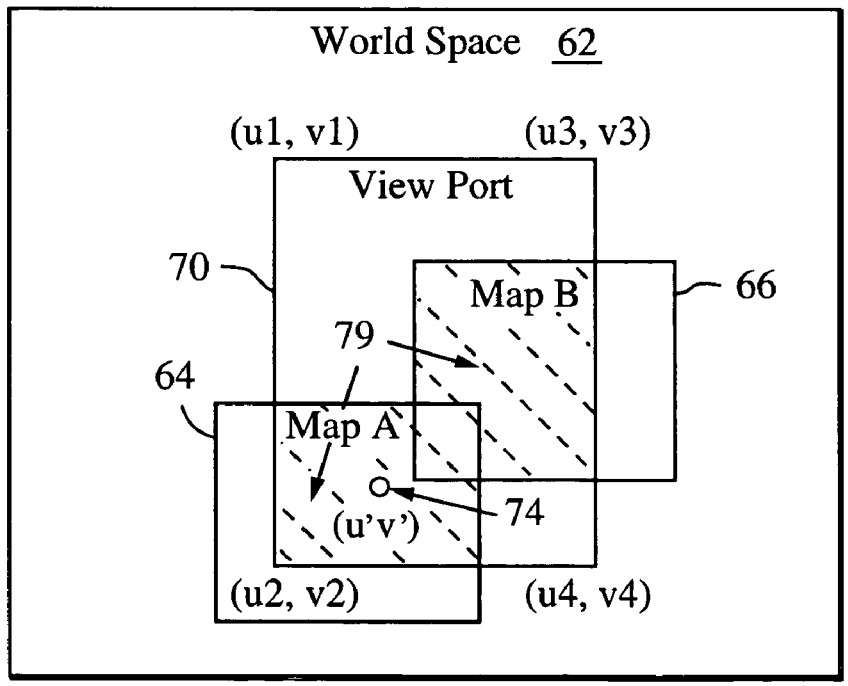

78) as shown in FIG. 4*d*. For each (u', v') coordinate, the application performs an intersection test with every rectangular map region in world space. If a (u', v') coordinate falls within a map region, a pixel is sampled and assigned to the associated (x', y') pixel of the display. Given the view port shown in FIG. 4*d*, all (u', v') coordinates falling within the shaded areas 79 will have to be sampled.

Figure 4E:
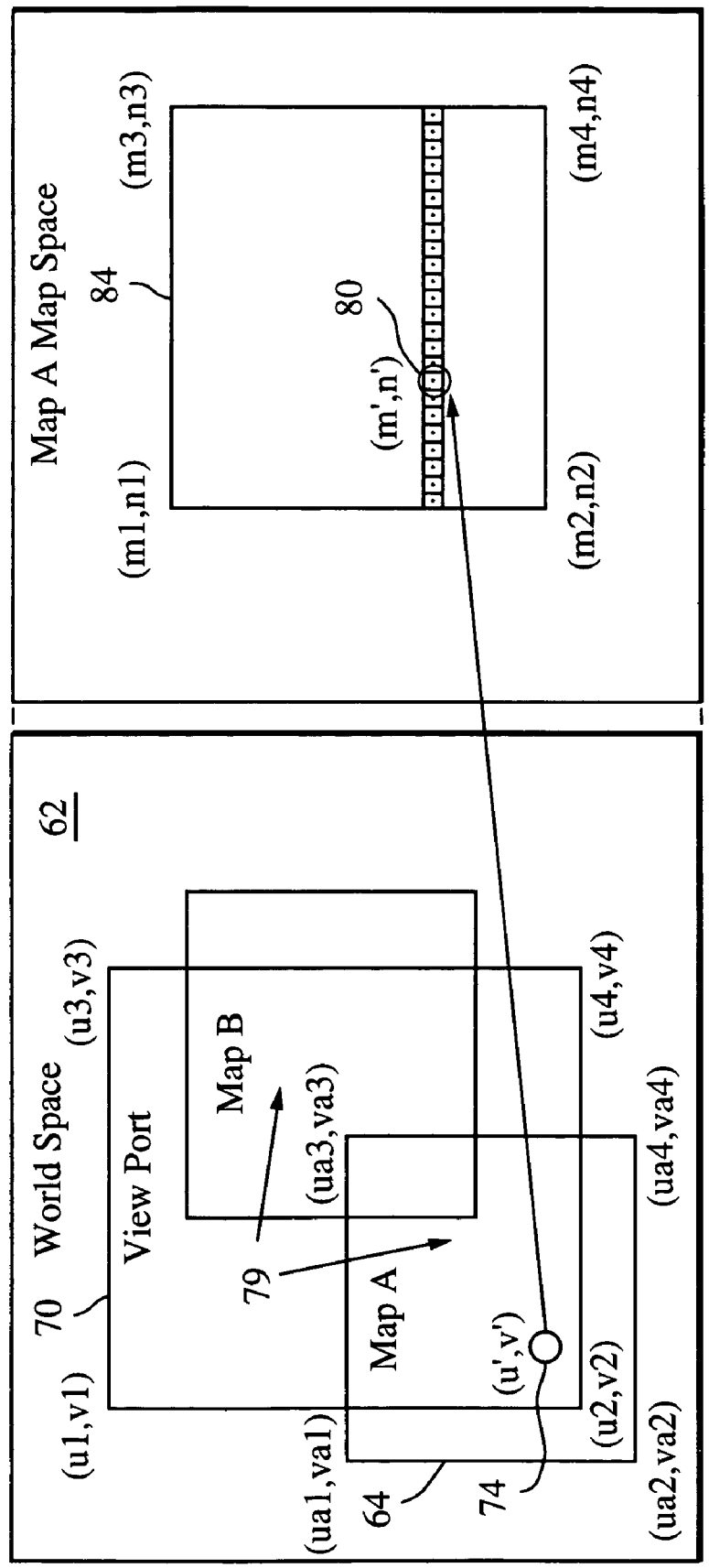
Figure 4F:
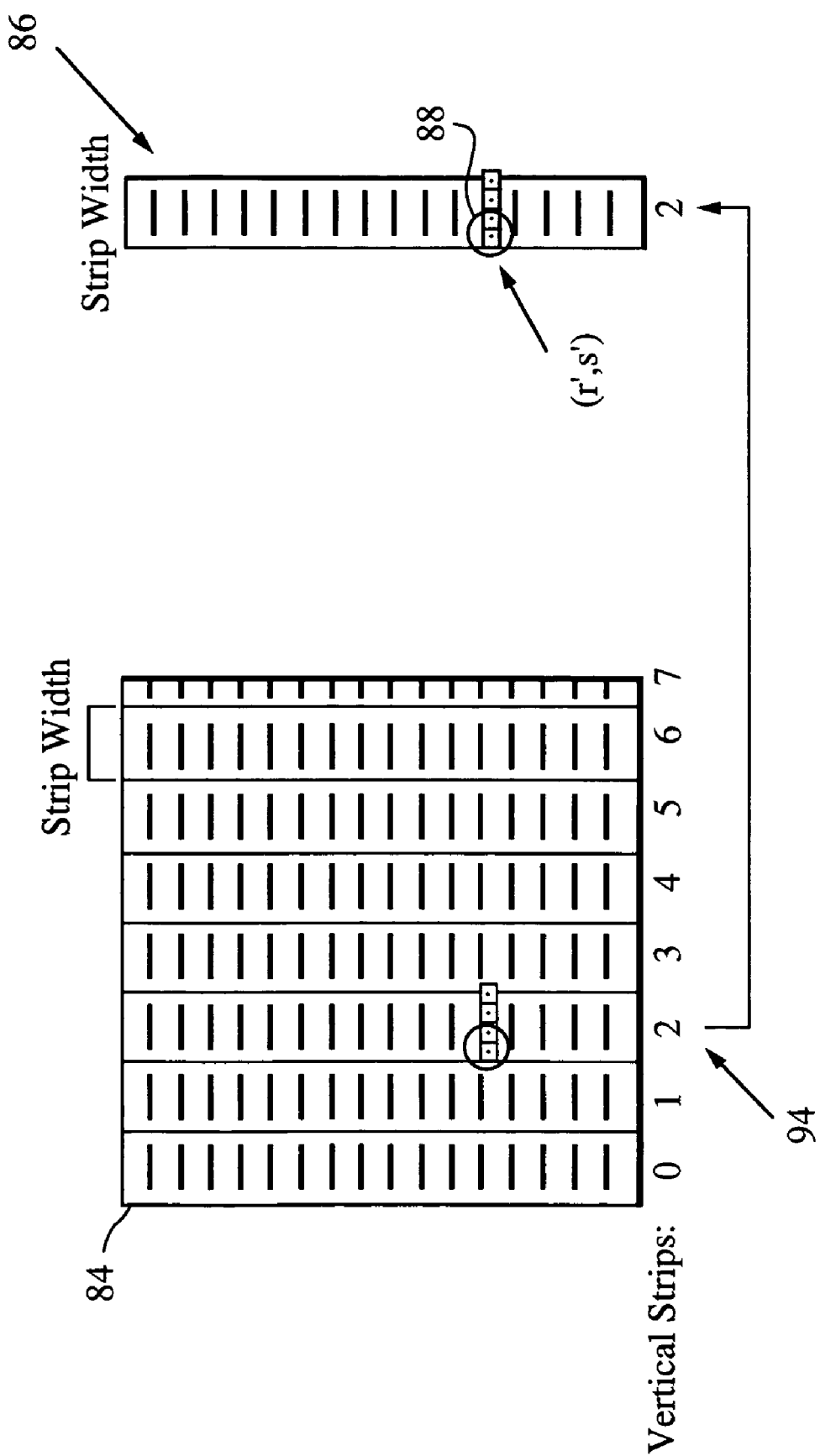

The application converts the world space coordinates (u',v') 74 in intersecting areas 79 to map space coordinates (m', n') 80 using a second affine transformation (step 82) as shown in FIG. 4*e*. Assuming that a (u', v') coordinate falls within a rectangular map region defined by world space coordinates (ua1, va1), (ua2, va2), (ua3, va3) and (ua4, va4), and the map image data associated with that rectangular region has map space coordinates (m1, n1), (m2, n2), (m3, n3) and (m4, n4), then the application converts (u', v') to (m', n') as follows:

First, the application computes these four slope values:

$$dmdu=(m3-m1)/(ua3-ua1)$$

$$dndu=(n3-n1)/(ua3-ua1)$$

$$dmdv=(m2-m1)/(va2-va1)$$

$$dndv=(n2-n1)/(va2-va1)$$

Then the application solves for m' and n' using the formula:

$$m'=m1+(v'-v1)*dmdv+(u'-u1)*dmdu$$

$$n'=n1+(v'-v1)*dndv+(u'-u1)*dndu$$

FIG. 4*e* shows the conversion of world space coordinate (u', v'), which falls within the Map A rectangular region 64, into an (m', n') map space coordinate to access the Map A image data 84. If all maps within world space are considered to be north oriented (which is true for most map data available), then the maps are not rotated in world space, which means that further optimization can be made. If the map is north oriented then n3−n1=0 and m2−m1=0. This makes the slope dndu=0 and the slope dmdv=0. This simplifies the two equations to:

$$m'=m1+(u'-u1)*dmdu$$

$$n'=n1+(v'-v1)*dndv$$

Essentially, the equation becomes a linear interpolation along the horizontal axis of the map in map space that is only dependant on the horizontal coordinate to solve for m' and then a linear interpolation along the vertical axis of the map that is only dependant on the vertical coordinate to solve for n'.

Image data 84 is arranged in a series of vertical strips 86, each of pixel width: StripWidth. Map coordinates (m',n') 80 can not be used to directly access the map image data. Instead the application uses (m',n') to first determine in which vertical strip the coordinate lies and then converts (m',n') into vertical strip column coordinate (r', s') 88 (step 90). The RGB pixel value is sampled from the vertical memory strip and assigned to the corresponding view port display pixel (m',n') (step 92).

To find which vertical strip contains (m', n'), the application applies the formula:

$$VerticalStrip=floor(m'/StripWidth)$$

The application than applies the following formula to convert (m', n') to (r', s'):

$$r'=mod(m', StripWidth)$$

$$s'=n'$$

Using the Vertical Strip index 94 and the (r', s') coordinate 88, the application samples the RGB pixel value from the map image data 84 and assigns it to the (x', y') display coordinate.

By comparison an affine algorithm using a conventional row-by-row bitmap would perform poorly when rotating a large image because large images have a large horizontal width in pixels. If two pixels are in two different rows of an image, they will be (difference in image rows * image width in bytes) apart in memory. "Image width in bytes" will be large, in this case, because of the large horizontal width in pixels of the image. The second pixel is not likely to be in the sane memory address region as the first pixel, which is currently loaded into cache memory on the CPU. If these two pixels are accessed in sequence, a CPU cache miss is likely to occur because of their distance apart in memory. A CPU cache miss forces the CPU to retrieve the second pixel from DRAM rather than cache, an operation an order of magnitude slower than if it was able to "cache-hit." If a large image is rotated to 90 or 270 degrees while zoomed out (the worst case), the affine algorithm will be accessing pixels in sequence that are multiple image rows apart. This means that the affine algorithm may cache-miss on every single pixel it samples from the image.

As just illustrated, the current mapping application splits the image into constant width vertical strips 86 whose pixel row width is a small fraction of the full pixel row width of the image. Using the example above, this effectively makes "image width in bytes" smaller, increasing the chances that pixel 2 will be within the same memory region as pixel 1, making a cache-hit more likely. The tradeoff of the approach is that rotations of 0 degrees, which tend to access horizontal pixels in sequence, have the chance of accessing a pixel 1 in one vertical strip and a pixel 2 in a separate vertical strip, incurring a cache miss. However, the increased rate of cache missing for horizontal orientations will be orders of magnitude lower than the chance of cache missing for a vertical orientation with an unoptimized affine algorithm. The current approach provides balanced performance over all rotations as compared to the standard affine transform, which is optimum for 0 degrees but degrades rapidly with rotation. To implement this optimization, the mapping application as described above stores image data in a vertical strip format and its affine algorithm samples from a vertical strip format rather than a standard bitmap orientation. This optimization has been shown to reduce a 10× performance penalty in the worst case (rotated 90 or 270 degrees) to a 3× performance penalty.

The number of vertical strips allocated depends on the StripWidth in bytes, pixel width, and pixel color depth (bits per pixel). For example:

StripWidth=128 bytes

PixelWidth=1200 pixels

PixelColorDepth=2 bytes (16 bits per pixel: 65,536 colors)

VerticalStrips Allocated=floor (PixelWidth*PixelColorDepth/StripWidth)+1= (1200*2/128)+1=19

Figure 4G:
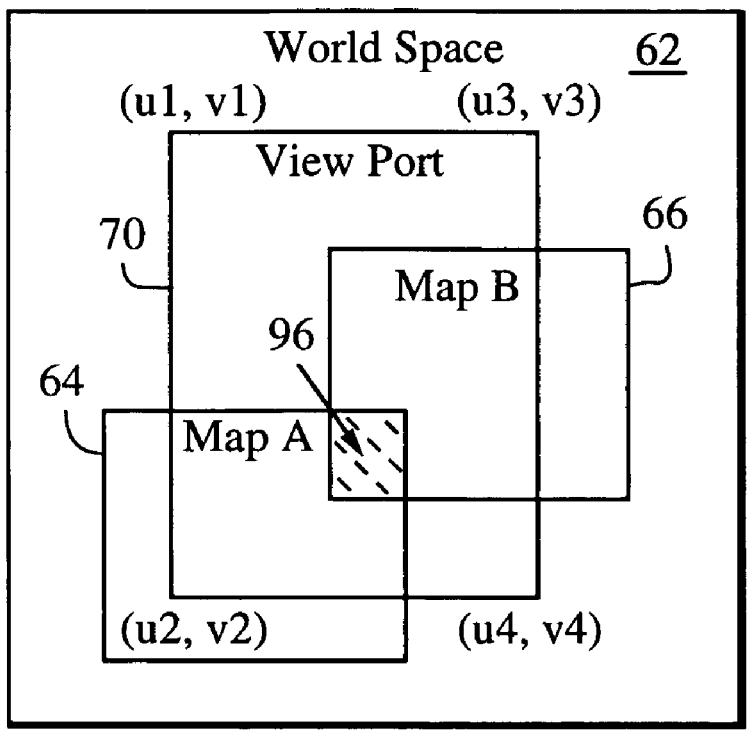
Figure 4H:
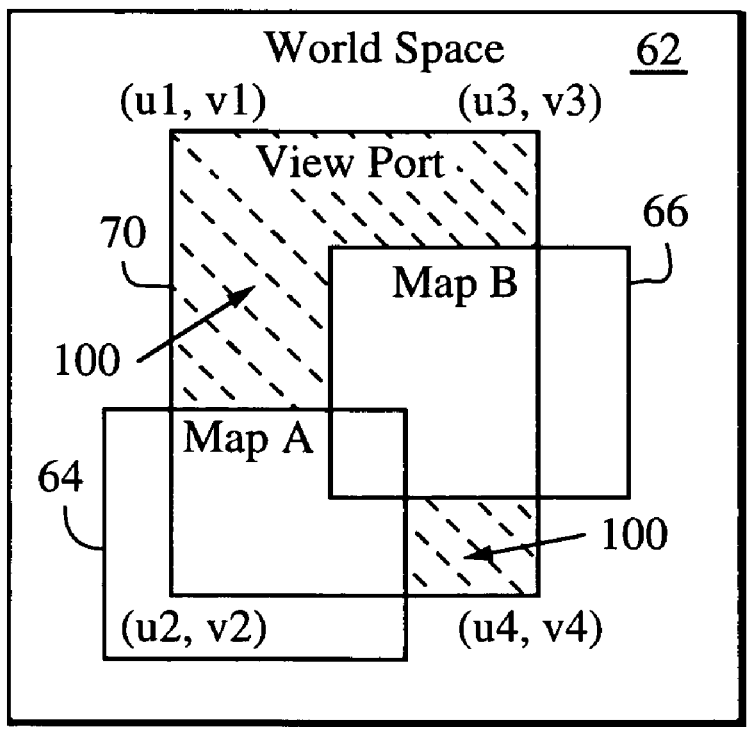

It is not uncommon that maps will overlap in world space either because of their geo-reference or because the user places one map on top of another. In this case, the application must arbitrate how to display the overlapping portions 96 of the maps A and B associated with rectangular regions 64 and 66 (step 98) as shown in FIG. 4g. The application may decide which map is "on top" and sample only that map or it may sample the multiple maps together and blend their color values in a weighted average using a linear interpolation. For example, the formula for blending MapA and MapB, where Map A is "on top" of Map B is:

$$(x', y')RGB \text{ vector} = (\text{sampled Map } A \text{ } RGB \text{ vector}) * \text{Alpha} +$$
$$(\text{sampled Map } B \text{ } RGB \text{ vector}) * (1 - \text{Alpha})$$

where Alpha is some fraction of 1 representing the transparency of Map A, 1 being opaque and 0 being completely invisible. Alpha is a settable property for each map in world space, representing how "transparent" the map is. Transparency allows the user to see two maps of the same region blended together without having to constantly flip between them. The application assigns all non-intersecting world space pixels 100 a background color value (step 102) as shown in FIG. 4h.

Figure 4I:
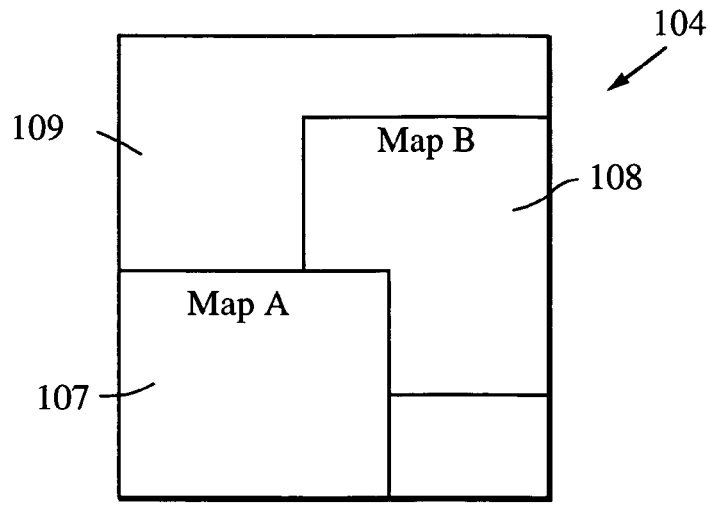

Once all view port pixels are assigned a color value, the display 104 is "painted" with the RGB values that have been assigned to the view port (step 106). As shown in FIG. 4i, map A 107 is considered to be on top of Map B 108, and both are overlaid on background 109.

Figure 5A:
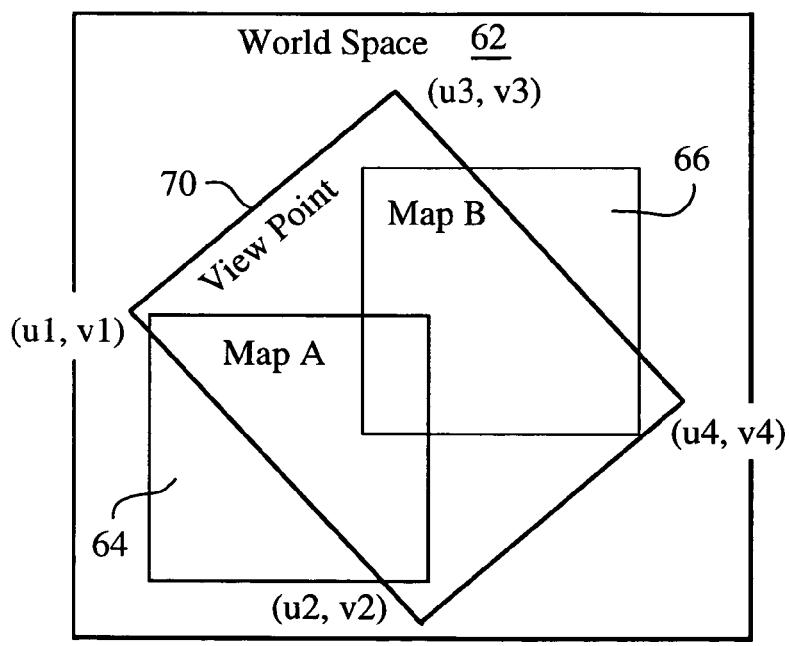
FIGS. 5*a* and 5*b* are diagrams of a rotated view port in world space and the painted display.
Figure 5B:
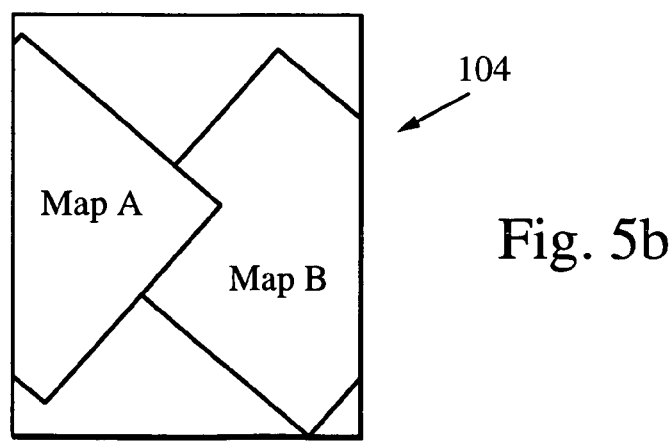

The application continues to update world space 62 and the size and position of the view port 70 in world space in response to the user's navigation commands and to perform the modified affine transformation and render the image data in near real-time. As shown in FIGS. 5a and 5b, the view port 70 has been rotated by 45° in world space 62. The pixels (x',y') in the view port in display space are mapped to (u',v') coordinates in world space using the aforementioned modified affine transform. Because the image data for Maps A and B is stored in memory in vertical strips, the number of cache misses is minimized and the transformation is executed in near real-time. The world space coordinates inside the view port that intersect with a map are converted into map space coordinates (m',n'). The application determines the vertical strip in memory and the column coordinate (r',s') for each coordinate. The RGB pixel value is sampled from that location in the memory strip and assigned to the corresponding view port pixel (x',y') to paint the display.

Figure 6:
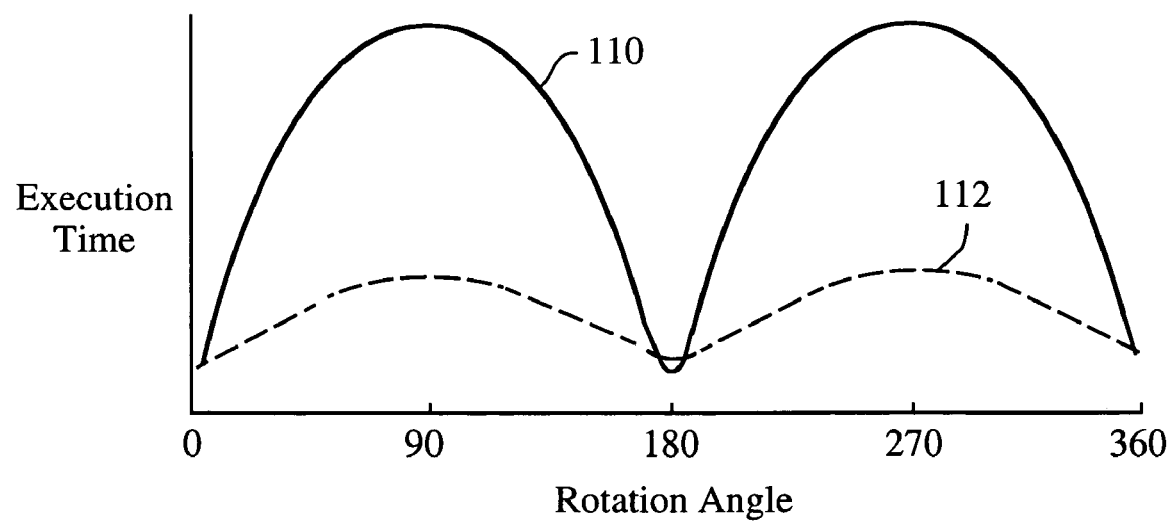
FIG. 6 is a plot of execution time versus rotation for rendering maps.

The relative performance of an affine transformation that uses standard row-by-row bitmaps versus the modified affine transformation that uses vertical strips of memory is shown in FIG. 6, which plots execution time versus rotation. The execution time 110 for a row-by-row bitmap is optimum for rotations of 0° and 180° but increases rapidly and experiences worst case at 90° and 270° where the probability of experiencing a cache miss is the highest. By comparison the execution time 112 for a vertical strip bitmap is slightly larger for rotations of 0° and 180° but only increases slightly with rotation. The modified affine transformation effectively smoothes out the performance curve for all rotations of large bitmaps In hand held mapping devices, and particularly those that operate in track-up mode, on average the execution time using the modified affine transformation will be orders of magnitude less than the standard affine transform, providing near real-time performance. Furthermore, the execution time 112 can be optimized for a particular platform by modifying the StripWidth; a wider strip reduces the chance of cache miss for rotations of 0° and 180° and a narrower strip reduces the chance of cache miss for rotations of 90° and 270°.

Figures 7A, 7B:
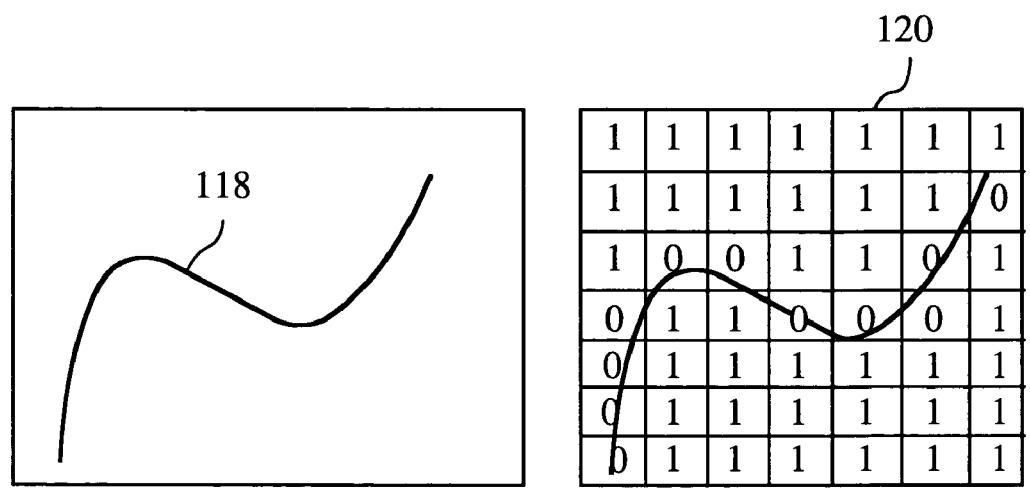
FIG. 7 is a 1-bit per pixel vector map.

Finally, map software is typically required to render line segment data. As mentioned before, the performance limiter for consumer navigation software is how many line segments (roads, borders, etc . . . ) are displayed on screen at once, since every line has to be drawn per frame. It would seem that an affine algorithm would be useless in this respect since it is intended to render image data, not line segment data. However, the mapping application uses the affine algorithm in an innovative way that eliminates the need to draw line segments every frame. The mapping application draws all of the line segment data 118 to a large off-screen monochrome bitmap 120 as illustrated in FIG. 7, and then feeds the bitmap into the affine engine like any other picture image. The color white (binary "1") of the monochrome bitmap is treated as transparent so that it appears to the user that only the black pixels (the rendered line segments 118) are drawn on screen. The big advantage of the approach is that the number of line segments rendered becomes irrelevant to performance since they are all pre-rendered. The disadvantages are the memory hit from creating a large bitmap and that line thickness will scale with all of the other picture imagery (for most types of line segment data, it is desirable for line segments to stay the same thickness regardless of zoom level).

Figure 8:
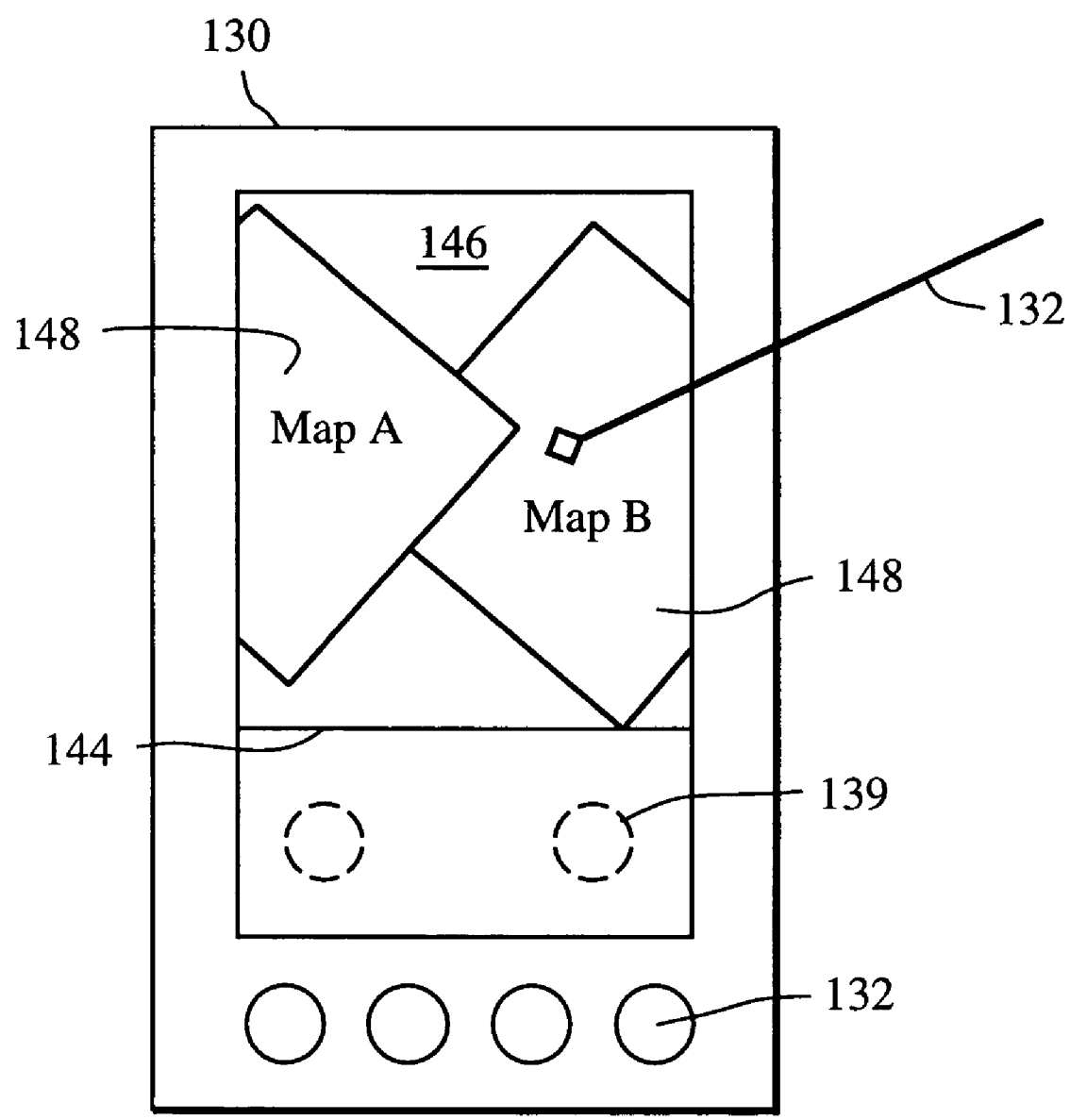
FIG. 8 is a perspective view of a hand held display implemented with the mapping tool.
Figure 9:
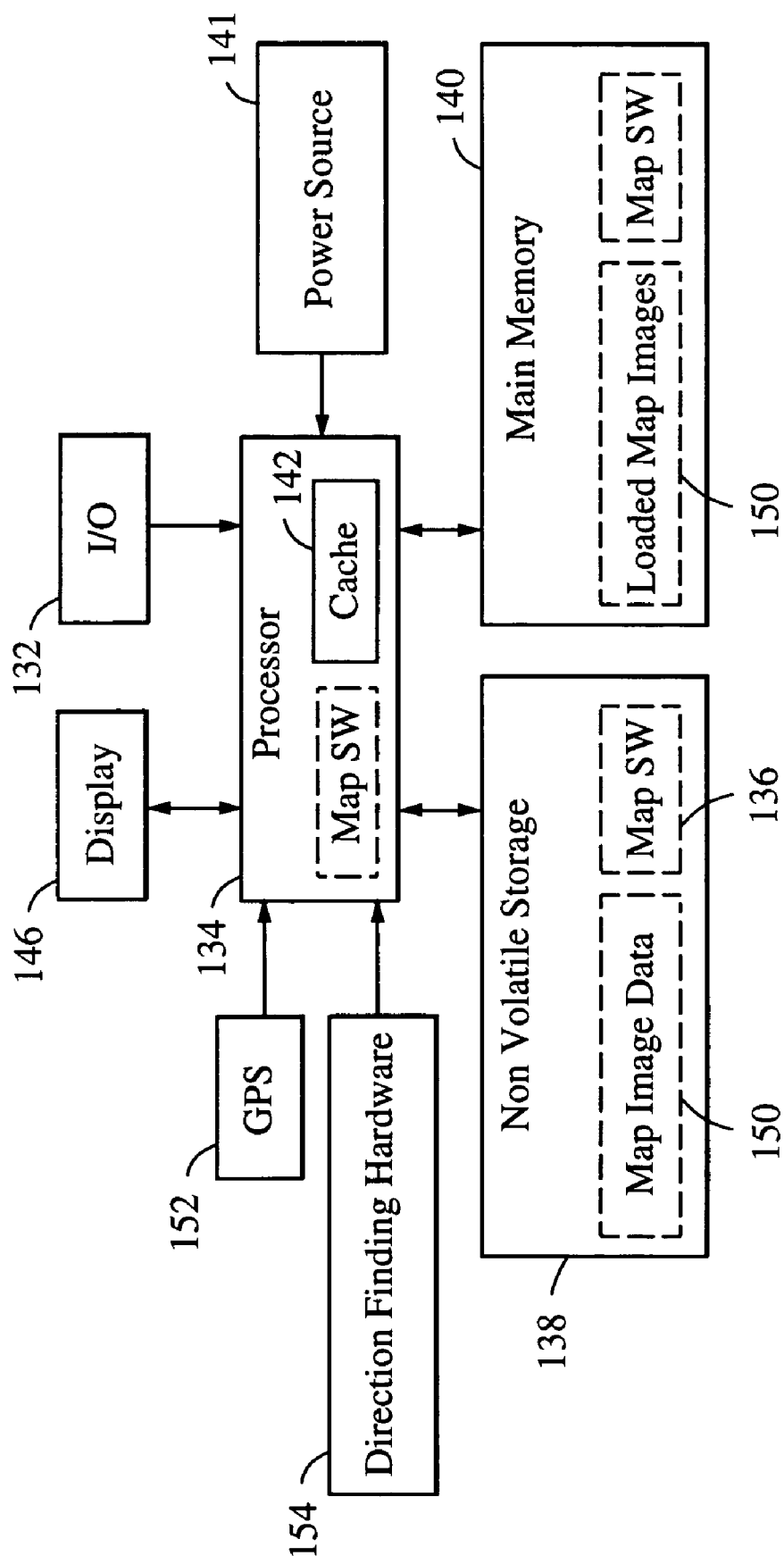
FIG. 9 is a hardware block diagram of the hand held display.

As mentioned previously, the mapping application is particularly well suited for rendering pixel imagery on hand held devices with limited processing power and memory and small display sizes. The capability to navigate multiple maps in near real-time and operate in track-up mode will be critical to many military and commercial applications. As shown in FIGS. 8 and 9, the mapping application is embodied in a hand held device 130 such as a military GPS handset, Pocket PC or a Palm Pilot, hereafter referred to as a "PDA". These PDAs will typically have more processing power and memory than typical consumer devices but far less capability than PCs or even laptop computers.

To start the mapping application, the user employs an I/O device 132 e.g., a stylus and touch screen or buttons, to inform the operating system (OS) running on the processor 134 to load the mapping application software 136 from non-volatile storage 138 into main memory 140. For a Windows OS, the user double clicks on the executable icon 139 representing the mapping application. Non-volatile storage 138 in a PDA is typically flash memory. Main memory 140 is almost always some form of dynamic RAM, usually SDRAM or DDR SDRAM. The PDA is typically used in a wireless, mobile environment and thus requires a mobile power source 141 such as a lithium-ion or alkaline battery.

The PDA processor 134 typically has a small amount of cache memory 142, 16 or 32 kb compared to 512 kb for typical desktop processors by today's standards. Cache memory 142 is useful for speeding up the processor's interaction with main memory 140 by adding a super-fast portion of memory that can "cache" areas of main memory so that the processor spends most of its time interacting with fast cache instead of slow main memory. Cache 142 "mirrors" portions of main memory 140 that the processor 134 has recognized as memory address ranges of frequent use. When the processor 134 interacts with a memory address that happens to be within the range "mirrored" by cache, the processor interacts with the cache instead of main memory, speeding things up (cache hit). If the processor accesses a memory address range that is not mirrored by cache, a cache miss occurs, the processor gets the value from main memory instead, and a portion of cache is flushed and loaded to mirror the address range that contains the newly accessed address.

Once in main memory 140, the OS allows the processor 134 to execute the mapping application. The mapping application establishes its own internal data structures in main memory and then displays a view port 144 on a display 146 such as a small touch screen LCD. View port 144 is an area of the display 146 where map imagery 148 can be seen by the user. Using the on-screen interface, the user loads image data 150 from non-volatile storage 138 into main memory 140 where it is preferably stored in vertical strips. Once in main memory 140, the mapping application uses the map image data 150 to render maps 148 onto the view port 144. Map Image data is usually large, so only a subset of maps is typically loaded into memory, usually selected according to the immediate location of the user. The mapping application uses this information to define the current instantiation of world space.

Given a loaded set of maps 148 displayed on display 146, the user uses I/O 132 to create and edit navigation objects such as waypoint, routes, and areas of interest on the maps. The user can also pan, zoom, and rotate the maps according to his or her desire. The mapping application responds to changes in the view port translation, scale and orientation in world space and performs the modified affine transformation to paint the view port on the display with the appropriate portion of world space. Because image data is preferably stored in vertical strips of main memory, incidence of cache misses averaged over all rotations will be dramatically reduced, hence execution time will be much faster.

If navigation hardware 152 such as a GPS receiver is present on the PDA and geo-referencing data is provided with the map image data 148, the user can navigate based on his/her location relative to the loaded maps. If direction-finding hardware 154 is present, such as a digital compass or accelerometer, then the user's orientation can be displayed relative to the map's orientation. Direction can also be computed with GPS when the user moves to a new location at a minimum velocity with a constant direction. With direction-finding hardware 154 and the mapping application's ability to rotate maps in near real-time, an additional feature of "track-up" is enabled. In "track-up" mode, the mapping application will automatically rotate the map according to the user's orientation, so that the direction the user is facing is always upward on the view port 144.

Other important optimizations have been added to the affine algorithm to make it operate efficiently on a hand held device including using integer fixed point over floating point math whenever possible, double-word read/writes to write out the map data and double-buffering to paint the entire view port at once.

Embedded processors developed for PDA's such as Intel's XSCALE and Bulverde typically lack floating point units. Embedded processors normally do not run applications that favor intensive floating point calculations, so the floating point unit is removed to save power and space for integrated components like memory controllers, display controllers, etc. . . . Whenever an embedded processor needs to execute a floating point operation, it must emulate it with a series of integer instructions. The performance hit when doing a large number of real number calculations is high.

Because the mapping application in performing the affine transformation deals with slopes of lines during its linear interpolation, the processor must do several real number calculations per pixel. This can significantly degrade performance in an affine transformation.

The technique of fixed point math is used to solve this performance issue. Fixed point math is a way of using integers to emulate real numbers. To produce a fraction, an integer is multiplied by a fixed constant. This size of the fixed constant represents the range of the "fractional" part of the fixed point number. So, if you multiplied a number by 1000, you would have a fractional range of 0-999, or in decimal 0.000 to 0.999. This fractional part can be used in normal integer calculations while still maintaining a fractional value of the number, much like doing calculations with a real number. After carrying out real number-like calculations with fixed numbers, the result can be returned to the actual integer value by dividing by the fixed constant.

In the mapping application, the current fixed constant used is 8096, giving it an accuracy of almost 4 digits after the decimal point. This leaves a range of +/−265,252 for the integer portion of the number using signed 32 bit integers. The mapping application uses a fixed constant that is a power of 2 because the processor can use fast shift operations instead of the slower integer multiply and divide operations. A fixed point implementation of the mapping application is approximately 2.5 times faster than a floating point implementation.

Memory performance is much more efficient when writing/reading double words (32 bit values) as opposed to writing/reading individual bytes (8 bit values) when dealing with memory in sequential orientation (it is faster to read a single double word than read 4 bytes in sequence). An affine transformation must access map data at an unknown location, so there is no easy way to optimize for word writes within this portion of the algorithm. However, the view port's memory is in sequential order, so when writing out the map data, it is advantageous to do so in double word writes. For this reason, the mapping application works on as many pixels at a time that can fill a double word, i.e. for a 4 bit per pixel display, it will work on 8 pixels at a time, because 1 double word=32 bits/4 bits per pixel=8 pixels. It then composes the resulting values for each of those pixels into a full double word that is then written to the view port. This optimization produces performance gains of about 5-10%.

Embedded processors are typically inefficient when it comes to updating the display. The processor has to access un-cached display memory in DRAM or go out on the bus to update an external LCD controller's embedded memory. For this reason, the mapping application's drawing algorithm constructs an entire graphics frame in an off-screen double-buffer, and then copies the entire frame to the view port using a single Windows API BitBlt call. This has the advantage of utilizing memory caching during frame construction, limiting the number of (slow) Windows API calls to one, and removing "flicker" from the display, because the entire display will be updated all at once.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A memory device encoding a mapping application for use with a display, said mapping application comprising the steps of:
   storing a plurality of maps in memory, each said map having its own map space comprising pixel data;
   in response to a first input, selecting a plurality of objects assigned to different said maps and arranging them in a world space coordinate system, each said object defining the extent of its map in world space;

in response to a second input, positioning a view port representing a portion of display space within world space;

for each pixel in the view port, assigning said pixel a world space coordinate using a first affine transformation from display space to world space;

for each assigned world space coordinate, determining which objects, if any, intersect the coordinate and for at least a topmost intersecting object determining its map space coordinate using a second object-specific affine transformation from world space to that object's map space based on the extent of that object's map in world space and sampling the object's map pixel data at its determined map space coordinate to assign a value to the associated pixel in the view port so that only object map pixel data that contributes to painting the display within the view port is sampled;

assigning a background value to the pixels in the view port that do not intersect an object; and painting the display with the map and background pixels assigned to the view port.

2. The memory device of claim 1, wherein the first affine transformation performs a first linear interpolation along a vertical axis of the view port and a second linear interpolation along a horizontal axis of the view port.

3. The memory device of claim 2, wherein the second affine transformation performs a linear interpolation along a vertical axis of the object in map space and a second linear interpolation along a horizontal axis of the object.

4. The memory device of claim 1, wherein the mapping application stores said pixel data for each said map in a plurality of vertical strips, each said vertical strip including multiple partial rows of row-oriented pixel data, in a main memory, a hardware caching operation retrieving pixel data from a sequential range of memory addresses around a most recently accessed address from a vertical strip in main memory and storing the pixel data into a cache memory.

5. The memory device of claim 4, wherein said pixel data is sampled from main memory by, determining the vertical strip in memory in which the pixel data resides;

converting the map space coordinate into a vertical strip column coordinate; and sampling the pixel data from the vertical strip at the column coordinate.

6. The memory device of claim 4, wherein the view port can be rotated 0 to 360 degrees to an arbitrary rotation angle within world space, whereby a probability of a cache hit over sill rotation angles of the view port when sampling pixel data is greater than if the pixel data were stored in rows of memory.

7. The memory device of claim 4, wherein first and second pixels stored in the vertical strips in memory are separated by the difference in their horizontal offset plus the difference in vertical rows multiplied by the width of the vertical strip.

8. The memory device of claim 4, whereby storing the pixel data in vertical strips of main memory increases a probability of a cache miss for view port rotations of 0° and 180° and reduces a probability of a cache miss for view port rotations of 90° and 270° when sampling the map pixel data.

9. The memory device of claim 4, wherein each said vertical strip includes pixel data from multiple complete columns and multiple partial rows of equal width.

10. The memory device of claim 1, further comprising for each assigned world space coordinate, if at least one other underlying object intersects the coordinate, determining its map space coordinate using a second object-specific affine transformation from world space to that object's map space based on the extent of that object's map in world space and sampling the object's map pixel data at its determined map space coordinate and arbitrating the overlapping objects by alpha blending the sampled map pixel data for the topmost object and said +at least one underlying objects.

11. The memory device of claim 1, wherein the first affine transformation automatically rotates the view port in world space according to the display's orientation so that the direction a user is facing is always upward on the view port.

12. The memory device of claim 1, wherein some of the maps are 1-bit per pixel maps of a line segment data.

13. The memory device of claim, 1, wherein a processor executes the mapping application using integer fixed-point math, writes out the pixel data to the view port in double words and constructs an entire graphics frame in an off-screen double-buffer and then paints the entire frame to the view port at once.

14. The memory device of claim 1, wherein said plurality of objects are arranged at different locations in world space according to their map's geo-location or user preference.

15. The memory device of claim 1, further comprising for each pixel in world space determining coordinates in map space and sampling map pixel data for only the topmost intersecting object.

16. The memory device of claim 1, wherein the view port rotates 0-360° and scales in world space in response to the input.

17. A memory device encoding a mapping application for use with a hand-held device in which a plurality of maps having their own map spaces are stored as pixel data in memory for presentation on a display, a processor executing the mapping application comprising the steps of:

selecting a plurality of objects assigned to different said maps and arranging them in a world space coordinate system, each said object defining the extent of its map in world space;

positioning a view port representing a portion of display space at rotation and scale in world space;

for each pixel in the view port, assigning said pixel a world space coordinate using a first affine transformation from display space to world space;

for each assigned world space coordinate, determining at least a topmost object, if any, that intersects the coordinate and for only said topmost intersecting object determining its map space coordinate using a second object-specific affine transformation from world space to that object's map space based on the extent of that object's map in world space and sampling the object's map pixel data at its determined map space coordinate to assign a value to the associated pixel in the view port;

assigning a background value to the pixels in the view port that do not intersect an object; and painting the display once with the map and background pixels assigned to the view port to render said plurality of maps at the same time.

18. The memory device of claim 17, wherein the first affine transformation performs a first linear interpolation along a vertical axis of the view port and a second linear interpolation along a horizontal axis of the view port, and wherein the second affine transformation performs a linear interpolation along a vertical axis of the object in map space and a second linear interpolation along a horizontal axis of the object.

19. The memory device of claim 17, wherein the mapping application stores said pixel data for each said map in a plurality of vertical strips, each said vertical strip including multiple partial rows of row-oriented pixel data, in a main memory, a hardware caching operating retrieving pixel data from a sequential range of memory addresses around a most recently accessed address from a vertical strip in main memory and storing the pixel data into a cache memory.

20. The memory device of claim 17, wherein the first affine transformation automatically rotates the view port in world space according to the display's orientation so that the direction a user is facing is always upward on the view port.

21. A memory device encoding a mapping application for use with a hand-held device in which a plurality of rectangular maps having their own map spaces are stored for presentation on a rectangular display, said mapping application comprising the steps of:
storing said pixel data for each said rectangular map in a plurality of vertical strips in main memory, a hardware caching operating storing pixel data for a range of addresses around a most recently accessed address from a vertical strip into a cache memory;
selecting a plurality of rectangular objects assigned to different said maps and arranging them in a world space coordinate system, each said rectangular object defining the extent of its map in world space;
positioning a rectangular view port representing a portion of display space with a specified translation, rotation and scale in world space;
for each pixel in the view port, assigning said pixel a world space coordinate by performing two liner interpolations, one along the vertical axis of the view port and a second along the horizontal axis of the view port from display space to world space;
for each assigned world space coordinate, determining which objects, if any, intersect the coordinate and for at least a topmost intersecting object determining its map space coordinate by performing two linear interpolations, one along the vertical axis of the rectangular object and the second along the horizontal axis of the rectangular object, based on the extent of that object's map in world space and sampling the object's map pixel data from cache and then main memory at its determined map space coordinate to assign a value to the associated pixel in the view port;
assigning a background value to the pixels in the view port that do not intersect an object; and
painting the display with the map and background pixels assigned to the view port to render said plurality of maps at the same time.

22. The memory device of claim 21, wherein only object map pixel data that contributes to painting the display within the view port is sampled.

23. The memory device of claim 21, wherein the two linear interpolations performed on each pixel in the view port automatically rotates the view port in world space according to the display's orientation so that the direction a user is facing is always upward on the view port.

24. A hand held device, comprising:
a display;
non-volatile storage for storing a plurality of pixel maps each having its own map space and a mapping application;
main memory into which the mapping application is loaded once initiated and segments of said pixel maps are stored in vertical strips, each said vertical strip including multiple partial rows of row-oriented pixel data, in response to user input;
a processor that retrieves pixel data from a sequential range of memory addresses around the most recently accessed address in a vertical strip of main memory and stores the pixel data in cache memory; and
user I/O for loading maps from non-volatile storage into main memory in a world space coordinate system and for navigating world space to position a view port representing a portion of display space therein,
said processor executing the mapping application to position one or more objects in world space that define the position and spatial extent of the respective maps, for each pixel in the view port, assigning said pixel a world space coordinate using a first affine transformation from display space to world space, for each assigned world space coordinate, determining which objects, if any, intersect the coordinate and for at least a topmost intersecting object determining its map space coordinate using a second affine transformation from world space to that object's map space based on the extent of that object's map in world space and attempting to sample the object's map pixel data at its determined map space coordinate to assign a value to the associated pixel in the view port from cache and if unsuccessful sampling the map pixel data from the vertical strip stored in main memory to assign a value to that pixel in the view port, assign a background value to the pixels that do not intersect an object and paint the display with the map and background pixels assigned to the view port.

25. The hand held device of claim 24, wherein the processor executes the first affine transformation by performing a first linear interpolation along a vertical axis of the view port and a second linear interpolation along a horizontal axis of the view port, and executes the second affine transformation by performing a linear interpolation along a vertical axis of the object in map space and a second linear interpolation along a horizontal axis of the object based on the extent of that object's map in world space.

26. The hand held device of claim 24, wherein the processor samples said pixel data by first interacting with cache memory to determine whether the map space coordinates are within the range of addresses for the vertical strip stored in cache and, if not, interacting with main memory by determining the vertical strip in main memory in which the pixel data resides, converting the map space coordinate into a vertical strip column coordinate, and sampling the pixel data from the vertical strip at the column coordinate.

27. The band held device of claim 24, whereby a probability of a cache hit is greater than if the pixel data were stored in rows of memory.

28. The hand held device of claim 24, whereby storing the pixel data in vertical strips of main memory increases a probability of a cache miss for view port rotations of 0° and 180° and reduces a probability of a cache miss for view port rotations of 90° and 270° when sampling the map pixel data.

29. The hand held device of claim 24, further comprising direction-finding hardware whereby the first affine transformation automatically rotates the view port in world space according to the display's orientation so that the direction a user is facing is always upward on the view port.

30. The hand held device of claim 24, wherein the user I/O is capable of rotating the view port 0-360° and scaling the view port in world space in response to a user input.

31. The hand held device of claim 24, wherein each said vertical strip includes pixel data from multiple complete columns and multiple partial rows of equal width.

32. The hand held device of claim 24, wherein said processor determines the topmost object, if any, that intersects the coordinate and for only the topmost intersection object determines its map space coordinate using second affine transformation to sample only the topmost object's map pixel data.

* * * * *